July 11, 1944.  J. F. AUBERSCHEK  2,353,433
FLUID FILTER
Filed Nov. 17, 1941
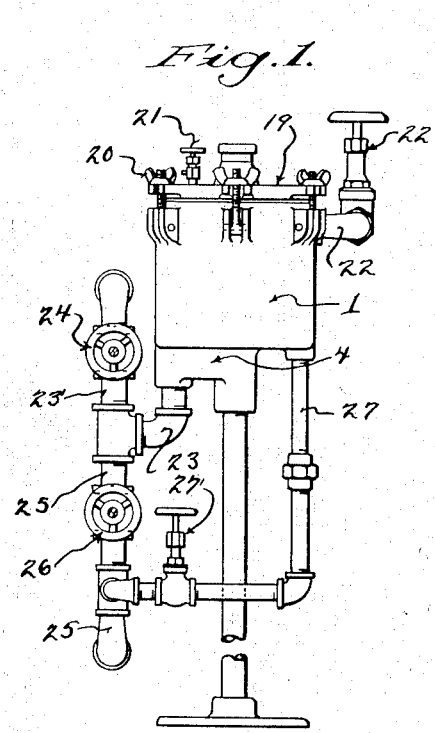
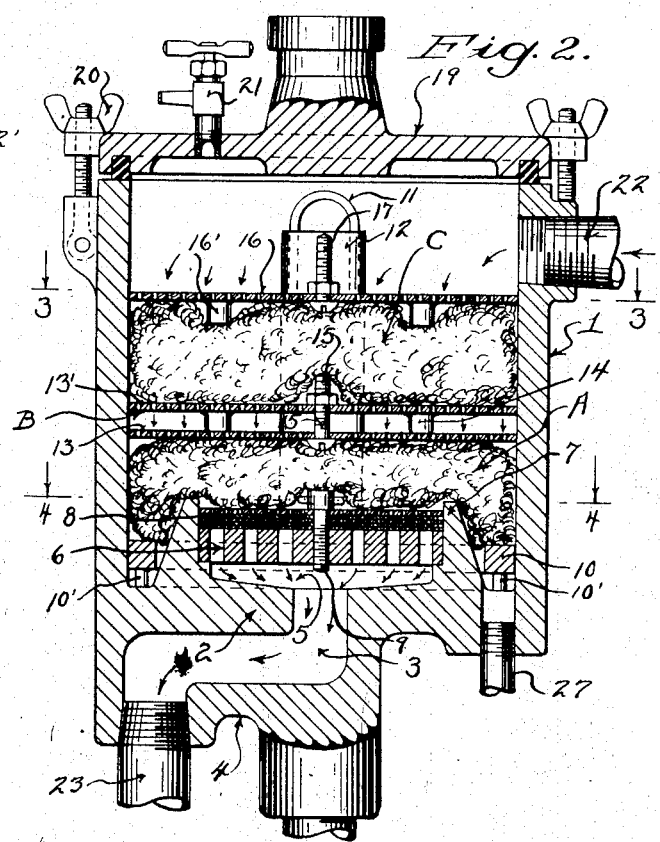
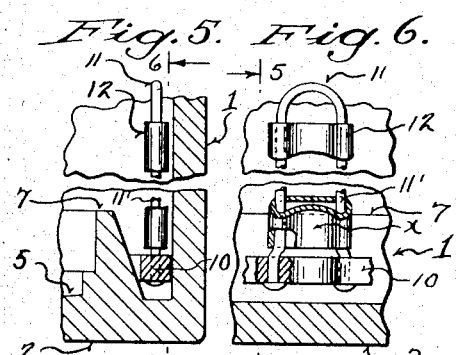
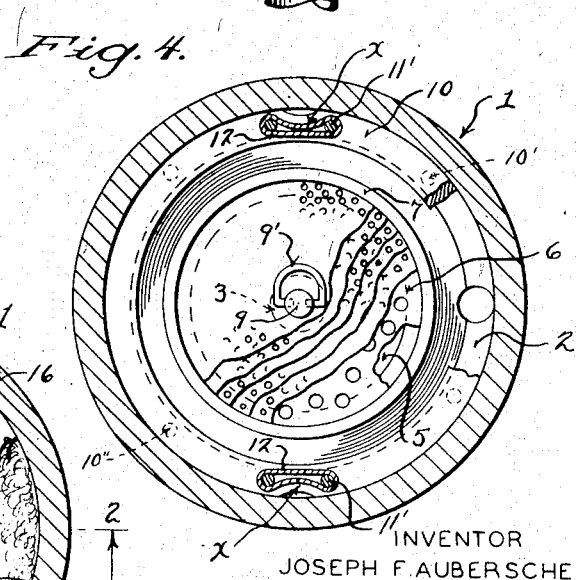
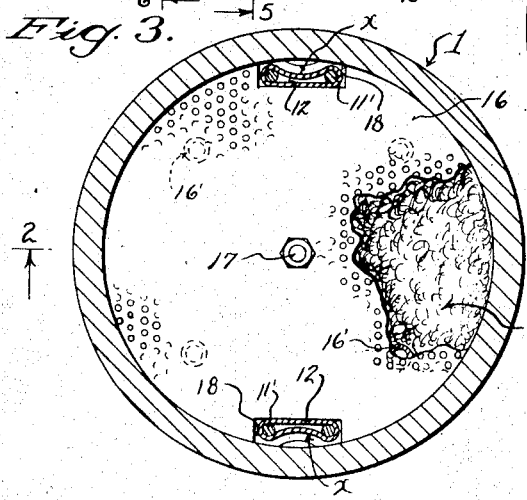
INVENTOR
JOSEPH F. AUBERSCHEK
BY
ATTORNEYS Patented July 11, 1944

2,353,433

UNITED STATES PATENT OFFICE 2,353,433

FLUID FILTER

Joseph F. Auberschek, Milwaukee, Wis.

Application November 17, 1941, Serial No. 419,427

2 Claims. (Cl. 210—134)

My invention has for its primary object to provide a fluid filter having nested therein alternating screen plates and filtering material compactly assembled in a housing, whereby a maximum volume of fluid is filtered within a minimum area.

Other objects of my invention are:

To provide a unit composite filtering cartridge which can by simple manual action be extracted from a housing for removal and renewal of the filtering material.

Another object of my invention is to provide valve control means associated with the filter housing, whereby said filter unit, when renewed, may be quickly washed or cleansed to eliminate impurities and coloring matter from the renewed filter prior to filtration of the fluid for domestic or commercial uses.

A further object of my invention is to provide means for venting the filter incidental to filtration of the fluid.

Another object of my invention is to provide the valve control means combined for the purpose of effectually draining the filter prior to renewal of the filtering material.

A further object of my invention is to provide a filter capable of effectually eliminating all foreign elements from water, whereby same is purified to be used for drinking purposes, photograph finishing laboratories or soft drink manufacturers; it being further understood, that the filter is capable of effectually filtering oils of any nature and particularly acid solutions whereby the cloudy or color liquid is cleared up. The device is also capable of effective use wherein cotton, coarse cloth or wood pulp may be employed as the pad element between metal screens.

For example, in filtering water, in practice it has been found advisable to use cotton layers or cloths, whereas, for slow filtration, to effectually clear up cloudy water, wood pulp may be used and wood pulp may also be used for oils and acid solutions.

With the above and other minor objects in view, my invention consists in certain peculiarities of construction and combination of parts as will be hereinafter fully set forth with reference to the accompanying drawing and subsequently claimed.

In the drawing:

Figure 1 represents a side elevation of a filter embodying the features of my invention, the same part showing the head and valve control connection from the source of fluid supply to discharge and to drainage.

Figure 2 is an enlarged longitudinal sectional view of the filter, the section being indicated by line 2—2 of Figure 3.

Figure 3 is a transverse sectional view of the filter, the section being indicated by line 3—3 of Figure 2.

Figure 4 is a transverse sectional view of said filter upon another plane, as indicated by line 4—4 of Figure 2.

Figure 5 is a detailed sectional view illustrating means for removing the filter unit, section being indicated by line 5—5 of Figure 6.

Figure 6 is a similar sectional elevation of the filter lifting means, the section being indicated by line 6—6 of Figure 5.

Referring to characters to the drawing, 1 indicates a cylindrical housing, the bottom 2 of which is provided with a centrally disposed fluid discharge channel 3 formed in an off-set boss 4. The mouth of the channel 3 is flared to form a circular fluid receiving pocket 5. The pocket is shouldered at its periphery for the reception of a filter disc 6, which disc is confined by a flange 7, which extends upwardly from the housing bottom, the outer circular walls of which are preferably tapered as best indicated in Figure 2.

The filter disc 6 forms a solid base for a plurality of nested metallic filter plates 8, it being understood that said plates from the top to the bottom of the series, are progressively formed from coarser to finer meshed perforations. The group of plates are centrally confined to the filter disc by a headed screw 9 carrying a pivoted ring 9', whereby the disc and associated screens may be conveniently removed.

The bottom surface of the housing between the inwardly tapered wall of the flange 7 and the circular inner wall of the housing has loosely fitted therein a ring 10, which ring is provided with a plurality of downwardly extending nibs 10' adapted to rest upon the bottom of the housing and to space the bottom of the ring 10 therefrom, whereby a water channel at this point is formed.

The ring has secured thereto at diametrically opposite points a pair of coarse wire loops 11. The parallel legs 11' have rigidly mounted thereon flattened hollow plates 12, the outer faces of which, as best shown in Figure 4, are bowed inwardly to form water drain pockets $x$, it being understood that these wire loops extend upwardly and terminate adjacent the mouth of the housing, whereby convenient access may be had thereto, and it is also noted that this pair of loops, which in practice constitute bails, are snugly fitted to the inner walls of said housing.

As best shown in Figure 2 of the drawing, a filtering pad A, of any suitable material is tightly packed over the filter disc 6, and owing to the fact that said filter disc is slightly below the upper edge of the flange 7, the said upper edge of the flange forms a circular compression point for the pad and incidentally the bottom of the pad is also compressed downwardly into the cavity of the housing above the ring 10 and also said pad of filter material is snugly pressed against the gang of discs 6. After this filter pad A is thus adjusted to the bottom of the housing, the double metallic circular screen B is tightly fitted upon the upper surface of said pad.

The screen B embodies a lower metallic screen disc 13 and an upper metallic screen disc 13'. The said disc has depending lugs 14 engaging the disc 13, whereby the companion pair of discs are spaced apart to form a free circulating water channel.

The disc units of the double screen are secured together by a nut and bolt 15, the upper extension of said bolt serving as a manipulating handle.

Mounted upon the upper screen 13 and pressed snugly against all juxtaposed surfaces, is a second filter pad C. A capping perforated filtering disc 16 is pressed against the upper surface of the pad C and said capping disc is provided with a plurality of depending lugs 16' which serve as compression fingers for the pad C. The capping disc is provided with a centrally positioned nut and bolt manipulating handle 17, whereby said disc is conveniently removed or inserted into position.

As best shown in Figure 3 of the drawing, all of the discs, making up the filter cartridge, are diametrically cut away at 18 to encompass the plate 12, which forms part of the manipulating bail or handle, whereby the entire cartridge is deposited within the housing or extracted therefrom.

While I have shown and described the filtering cartridge composed of a pair of cotton filter pads, it is obvious that cloth or wood fiber may be substituted therefore, and furthermore, in some instances, I may employ a greater number of filter pads interspersed with metallic screens.

The housing 1, is provided with a removable cover 19, which is provided with the usual gasket for seating upon the housing and a plurality of pivoted confining bolts and thumb caps 20, the same being of standard construction. The cover 19 also has fitted thereto a vent cock 21. A fluid supply pipe 22 is in threaded union with the upper end of the housing, and said pipe is controlled by a valve 22'. A fluid discharge pipe 23 is in threaded union with the bottom channel 3 of the housing and said fluid discharge pipe 23 is also connected to a fluid distributing pipe 23' having a valve 24. The fluid distributing pipe 23' supplies filtered water to any predetermined point.

A main drain pipe 25 provided with a valve 26, communicates with the discharge pipe 23 and distributing pipe 23', the said drain pipe serving to discharge waste into any suitable outlet.

A small drain pipe 27 having a valve 27' communicates with the bottom of the housing directly under the ring 10 and also with the main drain pipe 25 below the valve 26.

Hence the filter housing can be readily flushed and drained by closing valve 24 and opening valves 26 and 27'.

As best shown in Figure 1, when the device is filtering fluid, the valves 22' and 24 are open. Hence, the filtered fluid flows through the pipe 23 and 23' to any source of distribution. When the pads A and C become clogged with foul matter, through usage, and it is desired to renew same, the valves 22' and 24 are closed, and the valves 26 and 27' are opened, and also the vent valve 21, to relieve possible vacuum.

The stagnant fluid within the housing will then completely drain off from the channel 3 through these pipe connections to the sewer or waste, and also through the pipe 27. Thereafter, the cover 19 is removed and the filter cartridge is manually extracted from the housing by means of the bails 11. In the event that cotton is used for filter pads, the same would be removed and fresh cotton pads placed in position, it being obvious that the renewal of fresh pads would be effected by disengaging the retaining metallic screen members B and cap member 16.

In the event that filter cloths are used, the same when removed could be readily cleaned by any suitable means and also, should wood pulp be used, the same can be processed or cleaned readily and replaced.

It should be borne in mind, in order to produce maximum results, the filter pads, irrespective of what material they are composed, must be pressed snugly down, whereby the edges will fill up all grooves or crevasses. After the fresh filter pads are in place, they should be subjected to a stream of water to thoroughly clear same of any impurities, prior to a filtering operation and this is effected by simply opening the supply valve 22', it being understood that the other two valves are open. Hence, the fluid supply will in a few seconds flow through the filter to the sewer or waste. In this operation the petcock 21 is opened to permit the escape of foul gases, etc. Thereafter, the valves 26 and 27' controlling the waste to the sewer, will be closed also the pet cock 21, and the full supply of water will be thoroughly filtered and delivered to the point of use for drinking or other purposes.

While I have shown and described a simple exemplification of my invention minutely as to detail, it is understood that I may vary the structural features within the scope of the claims.

I claim:

1. A fluid filter, comprising a housing having inlet and discharge pipe connections at its ends, a flange extending upwardly from the bottom of the housing, the same being provided with an internal shoulder spaced above said bottom, a filter unit embodying a plurality of perforated discs seated upon the flanged shoulder to form a water pocket thereunder in communication with the discharge pipe connection, a ring removably fitted to the bottom of the housing about its flanged portion, bails extending upwardly from the ring adjacent the inner walls of said housing and terminating near the inlet end of the same, a plurality of filter pads, screened discs interposed between the pads, the bottom surface of the lower pad engaging the flange shoulder of the housing and bail carrying ring, said filter pads constituting a removable cartridge.

2. In a fluid filter, a housing having a fluid inlet adjacent to its upper end and a main fluid discharge outlet at its lower end, a filter cartridge mounted in the housing between the inlet and the outlet, a fluid distributing pipe, a main fluid drain pipe, a fluid discharge pipe communicating with the discharge outlet of the housing, said fluid discharge pipe having connection both with the distributing pipe and the main fluid drain pipe, valve means for controlling the flow of fluid from the discharge pipe either through the distributing pipe or the main drain pipe, and a branch drain pipe for the housing communicating with said housing at one side of the filter pad and the fluid discharge pipe and having communication with the main drain pipe at one side of said valve means, and a controlling valve in the length of the branch drain pipe.

JOSEPH F. AUBERSCHEK.